United States Patent [19]

Panetta et al.

[11] Patent Number: 4,614,250

[45] Date of Patent: Sep. 30, 1986

[54] LOGGING METHOD AND APPARATUS USING A SONDE EQUIPPED WITH MEASURING PADS

[75] Inventors: Pascal Panetta, Vanves; Jacques Tromelin, Longjumeau, both of France

[73] Assignee: Schlumberger Technology Corp., New York, N.Y.

[21] Appl. No.: 415,856

[22] Filed: Sep. 8, 1982

[30] Foreign Application Priority Data

Sep. 9, 1981 [FR] France ............................ 81 17065

[51] Int. Cl.⁴ .............................................. G01V 1/40
[52] U.S. Cl. .................................. 181/102; 181/105; 367/911; 166/241; 324/367
[58] Field of Search .................. 73/151, 152; 166/241, 166/65 M, 206; 181/102, 105; 250/268; 367/25–35, 53, 911; 324/333, 338, 351, 367, 374; 175/4.51

[56] References Cited

U.S. PATENT DOCUMENTS

| | | | |
|---|---|---|---|
| 2,708,316 | 5/1955 | Fredd | 33/178 |
| 3,167,707 | 1/1965 | Oliver | 324/367 |
| 3,423,671 | 1/1969 | Vezin | 324/347 |
| 3,474,541 | 10/1969 | Cubberly | 33/178 F |
| 3,510,757 | 5/1970 | Huston | 324/343 |
| 3,685,158 | 8/1972 | Planche | 33/178 F |
| 3,798,966 | 3/1974 | Planche | 73/151 |
| 3,915,229 | 10/1975 | Nicolas | 166/241 |
| 4,171,031 | 10/1979 | Marquis | 181/102 |
| 4,348,748 | 9/1982 | Clavier et al. | 367/25 |
| 4,399,692 | 8/1983 | Hulsing, II et al. | 73/151 |

FOREIGN PATENT DOCUMENTS

| | | |
|---|---|---|
| 1057035 | 3/1954 | France . |
| 2394097 | 1/1979 | France . |
| 2395516 | 11/1981 | France . |
| 726315 | 4/1980 | U.S.S.R. . |

*Primary Examiner*—Thomas H. Tarcza
*Assistant Examiner*—Ian J. Lobo
*Attorney, Agent, or Firm*—Stephen L. Borst; David G. Coker

[57] ABSTRACT

Dip measurements and investigation of geological formations traversed by a deviated borehole is carried out by means of an apparatus comprising a measuring sonde and a cartridge connected to a cable. The sonde carries four measuring pads regularly distributed by means of articulated arms which keep the pads parallel to the axis of the sonde. The opposite arms are forced to stay symmetrical in relation to the sonde.

The sonde is connected to the cartridge so that its axis can depart angularly from the axis of the cartridge, enabling the latter to rest on the borehole wall. The pads have a length smaller than twice the transverse dimension D of the sonde.

8 Claims, 9 Drawing Figures

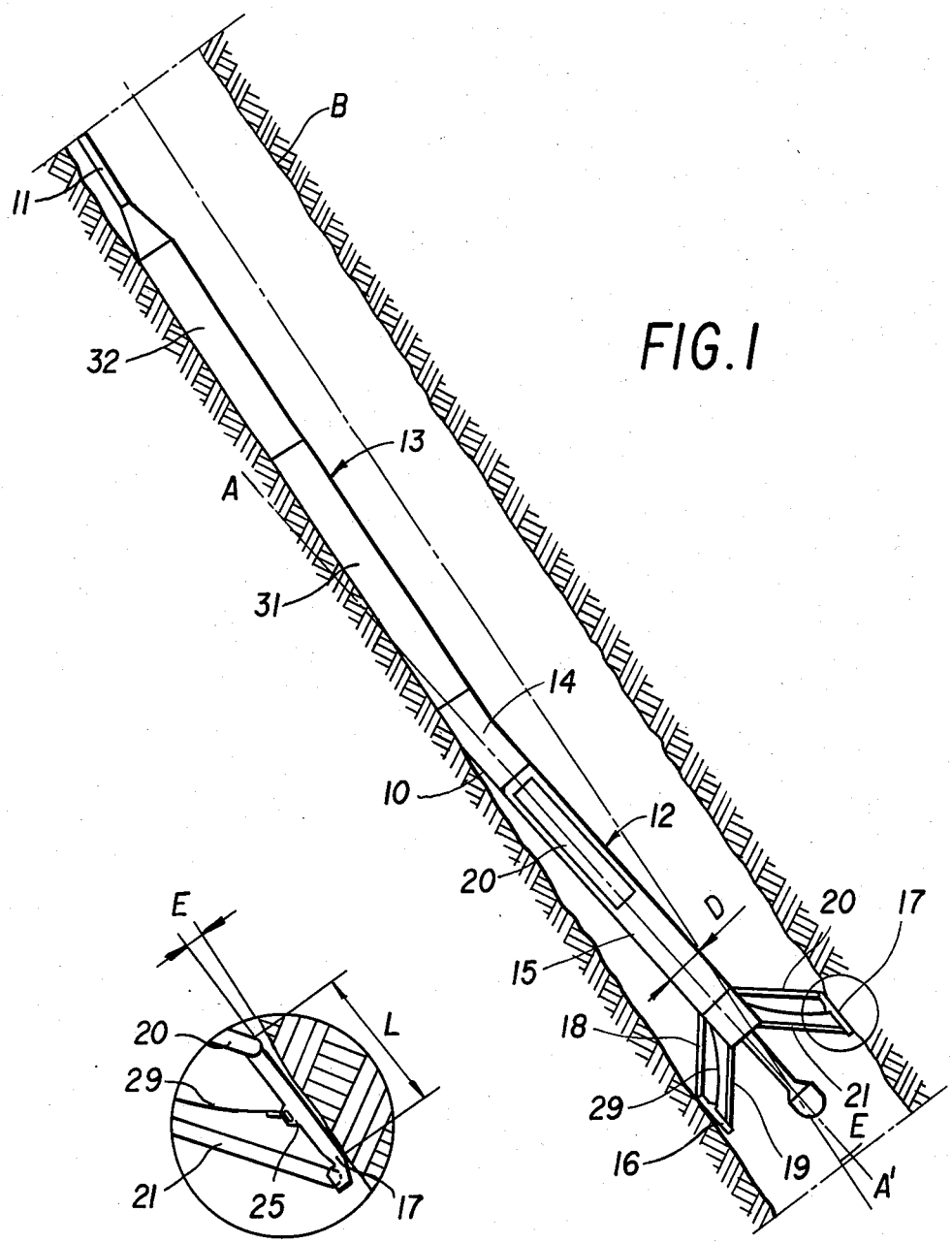

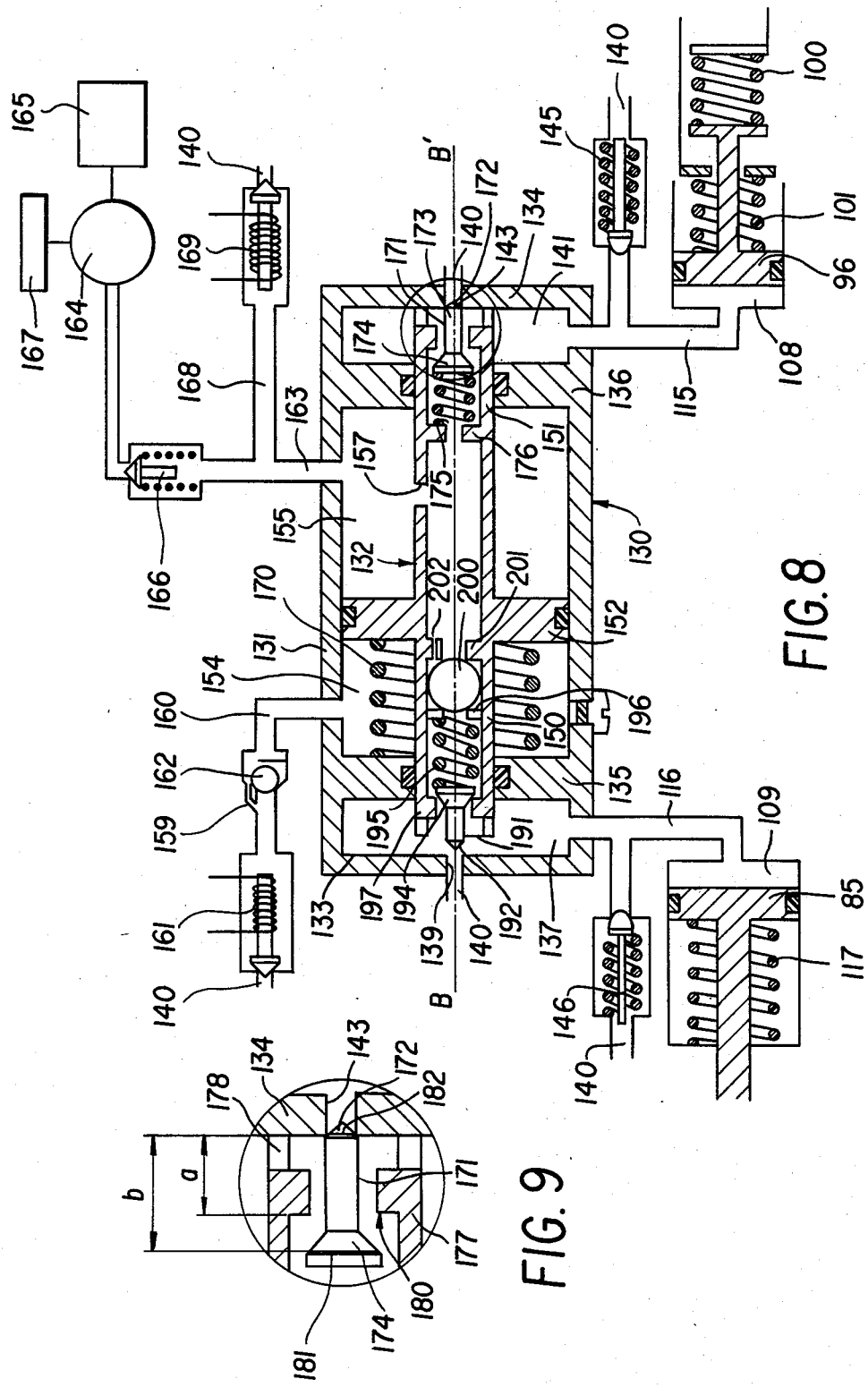

LOGGING METHOD AND APPARATUS USING A SONDE EQUIPPED WITH MEASURING PADS

BACKGROUND OF THE INVENTION

The invention relates to the investigation of formations traversed by a borehole by means of a sonde equipped with measuring pads.

To carry out certain measurements in boreholes, and in particular for dip measurements, pads are applied against the borehole walls, these pads being equipped with electrodes or transducers carried by arms articulated on a sonde body member and distributed symmetrically around the latter. The sonde body member is connected to an upper part or a cartridge which is suspended from a cable allowing electrical transmission to surface equipment. Resilient means act on the arms so as to apply the pads against the walls with a suitable pressure, and a system controlled from the surface equipment makes it possible to retract the arms along the sonde body member against the action of the resilient means. The pads are placed in contact with the walls only during measurement movements.

U.S. Pat. No. 3,685,158 (J. Planche) describes a dipmeter apparatus with four arms associated in two independent pairs, each pair comprising two opposite arms whose movements are linked. The opposite pads are thus always spread symmetrically in relation to the sonde body member, but the pads of one pair can be spread differently in relation to the pads of the other pair. This arrangement allows the pads to remain applied against the walls in the case of an oval hole, the pads then forming (view in plan) the apexes of a diamond in the center of which is located the sonde body member.

Furthermore, in the above-mentioned apparatus, the pads are forced to remain coplanar so as to simplify the processing of measurement signals. In other words, the pads can move laterally in relation to the body member only in a plane perpendicular to the sonde axis. This is accomplished by mounting the pads on slides carried by the arms and connecting them to the sonde body member by linkage systems in the form of a Y.

In deviated boreholes, the weight of the apparatus has a radial component with acts on the lower pad(s) against the action of the resilient means so that the upper pad(s) symmetrical in relation to the lower pad(s) have a tendency to leave the wall, thereby deteriorating the corresponding measurement signals. To reduce the effect of borehole inclination, it is possible, as provided for in U.S. Pat. No. 3,423,671 (A. Vezin), to mount elastic centering devices at the center of gravity of the apparatus. However, the compensation obtained is only partial and these centering devices, constantly in contact with the walls, undergo rapid wear. They can, moreover, be used only in boreholes of sufficient diameter.

U.S. Pat. No. 3,474,541 (W. E. Cubberly, Jr.) describes a caliper logging apparatus adapted to deviated boreholes in which an articulated joint connects the upper part (connected to the cable) to the sonde. The sonde has four arc springs arranged in two opposite pairs, the ends of which are connected to the sonde while remaining mobile along the longitudinal direction of the sonde. The movements of the ends of each pair of springs are measured to determine the size of the hole along two perpendicular directions. This known apparatus does not comprise pads kept parallel to the axis of the sonde, and hence differs basically from the invention.

SUMMARY OF THE INVENTION

It is thus an object of the invention to improve the application of the pads on the borehole walls in the case of a deviated borehole.

Accordingly, the invention provides, firstly, the possibility of an angular offset between the axis of the sonde and the axis of the cartridge, so that the cartridge can rest on the borehole wall during the measurement movement. The weight of the cartridge hence is not involved in the radial component acting on the lower pads. Only the weight of the sonde intervenes, thereby substantially reducing this component.

Secondly, a pad length (dimension parallel to sonde axis) at most substantially equal to twice the transverse dimension D of the sonde, and preferably substantially equal to 1.5 D, is provided. As the upper end of the sonde connected to the cartridge rests on the borehole wall, the axis of the sonde is consequently offset angularly from the axis of the borehole. A similar offset exists between the contact surfaces of the pads, kept parallel to the axis of the sonde, and the surface of the borehole walls. The resulting distance between the walls and the measuring elements (electrodes or transducers) generally located at pad mid-length is proportional to the length of the pads. With a length at most substantially equal to 2D, D being the transverse dimension of the sonde, and preferably of the order of 1.5 D, the distance between the measuring elements and the walls is minimized. Such a length corresponds moreover to a sifficient application surface to avoid the sinking of the pads into the walls in the case of nonconsolidated formations.

It is desirable, furthermore, to be able to adjust the resilient force applied to the pads. An increase in the pad application pressure is required in particular, whatever the inclination of the borehole, in the presence of very viscous drilling mud (gamboo). The U.S. Pat. Nos. 3,423,671 and 3,685,158 mentioned above provide an adjustment in the loading force but the adjustment range is insufficient, so that in order to obtain a very large force when required, it would be necessary to use very powerful springs, giving an excessive force for normal conditions. It is therefore yet another object of the invention to provide a method and apparatus for applying against the borehole walls the measuring pads of a logging sonde, characterized by the fact that said pads are placed at the end of articulated arms, and a first resilient force which is substantially constant whatever the position of the arms is applied to the pads as well as a second adjustable resilient force.

It is thus possible, in an independent manner, to define the first substantially constant force so that it corresponds to the appropriate value for normal conditions, and also to define the second adjustable force so that it exhibits an extensive adjustment range.

The invention will be better understood through the description given below read in conjunction with the drawings.

BRIEF DESCRIPTION OF THE DRAWINGS

FIG. 1 is a general schematic view of a dipmeter apparatus with articulated arms according to the invention, during a measurement in a deviated borehole;

FIG. 2 shows in greater detail a pad in contact with the borehole wall;

FIG. 8 is a diagram of the hydraulic system for actuating the arms;

FIG. 9 shows a detail of the diagram of FIG. 8.

DETAILED DESCRIPTION OF A REPRESENTATIVE EMBODIMENT

Figure 3:
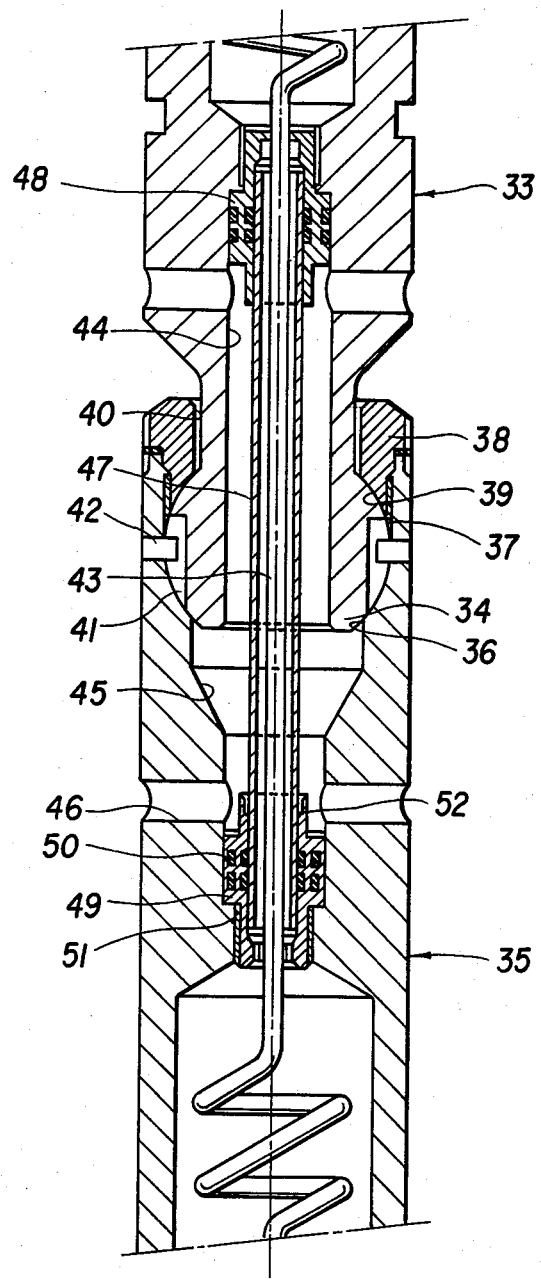
FIG. 3 is a sectional view of the joint between the upper part and the lower part of the apparatus.

FIG. 1 represents an oilfield borehole B traversing geological formations. In the section in which the measurements are carried out, this borehole exhibits a large inclination in relation to the vertical.

The dipmeter apparatus, designated generally by item 10, is suspended from a cable 11 connected to surface equipment, not shown. The cable 11 allows electrical transmission between the surface equipment and the apparatus 10. The apparatus 10 is designed in the form of an elongated body member of circular section adapted to movement in the borehole. It is composed of a lower part or sonde 12 and an upper part or cartridge 13 connected by a joint 14.

The sonde 12 includes a body member 15 whose axis AA' defines a longitudinal direction, and four measuring pads placed at 90 degrees around the body member, each carried by two arms. The arms include a main arm and a secondary arm hinged on the sonde body member 15. For clarity, FIG. 1 shows only one pair of opposite pads 16, 17 carried respectively by the arms 18, 19 and 20, 21, the references 18 and 20 designating the main arms and the references 19, 21 the secondary arms. Each pair of arms carrying a pad constitutes a parallelogram with the pad and the sonde body member 15 so that the pads are always parallel to the axis of the sonde body member 15.

Elastic means including leaf springs 29 act on the arms to move them laterally away from the sonde body member and to apply the pads against the borehole walls. The mechanism described below, mounted in the sonde body member and controlled from the surface equipment, makes it possible to retract the arms against the sonde. The pads are placed in contact with the walls only during measurement movements.

The main arms are coupled in opposite pairs so that two opposite arms, for example the arms 18 and 20, are always extended symmetrically in relation to the sonde body member 15. However, the two pairs of main arms are independent, i.e. the main arms of one pair can be extended differently in relation to the main arms of the other pair. This arrangement allows the pads to remain in contact with the walls in the case of an oval-shaped hole, the pads then forming (plan view) the apexes of a diamond whose center is the axis AA' of the sonde body member. It should however be noted that when the two pairs of main arms have different extensions in relation to the body member, the pairs of pads connected respectively with them take on different longitudinal positions. This arrangement of the pads is said to be "non-coplanar".

As seen in FIG. 2, each pad has an electrode system 25 which makes it possible to determine the resistivity of the formation opposite the pad. An appropriate electrode system is described, for example, in U.S. Pat. No. 4,251,773 (Cailliau et al.). This system comprises two electrodes placed side-by-side at the mid-length of the pad.

Means are provided in the apparatus to supply the needs of the electrodes and to receive and shape the measurement signals received therefrom. These means do not form part of the object of the invention and are therefore not described here. The four sets of signals collected are correlated in a known manner to determine the dip properties of the formations.

Furthermore, means sensitive to the lateral movement of each pair of arms are mounted in the sonde body. From the signals obtained, it is possible to calculate the size of the hole along two perpendicular directions and thus determine the shape of this hole at the different depths. This also gives the longitudinal positions of the pads of each pair in relation to the reference point on the body member. These positions, as it was seen, are variable and must be known in order to be able to carry oug suitable depth corrections.

Moreover, the dip properties (inclination and orientation of the line of greatest slope relative to horizontal) of the formations must be determined not in relation to the axis of the borehole but in relation to a terrestral reference. For this purpose, the sonde includes means sensitive to the inclination of the sonde axis in relation to the vertical and means sensitive to the orientation or azimuth of a reference plane going through this axis in relation to a given direction such as magnetic north. These means are grouped in a unit 30 mounted in the upper part of the sonde. This unit comprises three accelerometers for inclination determination and three magnetometers for orientation determination. Such apparatus are known and shall not be described here in detail.

The cartridge 13 comprises two parts, an electronic cartridge 31 connected to the joint 14 and a telemetering cartridge 32 connected to the cable 11. The electronic cartridge 31, in connection with the surface equipment, produces excitation and control signals and processes the measurement signals. The telemetering cartridge 32 constitutes the interface between the cable 11 and the electronic cartridge 31.

The joint 14 is shown in greater detail in FIG. 3. Its upper part 33, fixed to the cartridge, ends in a knuckle 34 in the shape of a truncated sphere. The lower part 35 of the joint, fixed to the sonde, includes at its end a bore 36 with a spherical surface which cooperates with the knuckle 34. The spherical bore 36 is extended by a threaded bore 37 in which is screwed a ring 38 serving to retain the knuckle 34. The bore of the ring 38 includes a spherical portion 39 for contact with the knuckle 34 and a conical portion 40 which allows an angular clearance between the lower part 35 and the upper part 33. The ring 38 is made up of two halves to allot it to be screwed after the introduction of the knuckle 34 into the bore 36.

The knuckle 34 includes, on its outer surface, slots 41 in which are engaged respective pins 42 fixed to the lower part 35. These pins prevent the lower part from rotating about its axis in relation to the upper part. However, the pins 42 do not penetrate fully into the slots, so that the lower part can move angularly in any direction.

The passage required for electrical conductors located in a duct 43 is provided by a central hole 44 formed in the upper part 33 and a central hole 45 extending the bore 36 in the lower part 35. Channels 46 allow the drilling mud to penetrate into these holes 44, 45 while providing balanced pressure on the different parts. The duct 43 is protected from the mud by a pressure-resistant flexible metal tube 47. The tube 47 has its ends engaged in sealing elements 48, 49 respectively closing central hole 44 of the upper part and the central hole 45 of the lower part. To provide effective prevention of mud passage, seals such as 50, 51 are mounted respectively on the outer surface and the inner surface of each sealing element. It will be noted that in each sealing element the bore receiving the tube 47 has a terminal flare 52 allowing an angular offset of the flexible tube 47 with respect to the considered sealing element.

The use of an articulated link between the sonde and the cartridge, is an inclined borehole, permits the cartridge to rest on the borehole wall, as shown in FIG. 1. The weight of the cartridge consequently is not involved in the radial weight component which is applied on the lower pad(s). This component thus results only from the weight of the sonde 12.

The sonde is centered in relation to the borehole at the level of the pads while its upper end, fixed to the joint 14, is in the vicinity of the wall. The resulting angular offset E between the axis of the cartridge (parallel to the axis of the borehole) and the axis of the sonde body member is then determined by the borehole diameter and the length of the sonde. For the pads, this angular offset results in an offset e between the electrodes 25 placed at the mid-length of the pads and the borehole wall, this offset being proportional to the length L of the pads designed to be in contact with the wall.

In the present illustrative embodiment, the length L of the pads is chosen to equal about 1.5 D, D being the outer diameter of the sonde body member. With the usual diameters, L corresponds to a length of about 15 cm. which furnishes a sufficient bearing surface to prevent the sinking of the pads into the walls. At the same time, this length is sufficiently small so that the offset e remains small and does not affect the quality of the measurements. However, for the case in which the upper pad(s) should lose contact, causing the significant weakening or even the disappearance of the corresponding measurement signals, provision has been made for the possibility of increasing the pad bearing pressure.

As was seen in FIG. 2, each pad has an associated leaf spring 29. This type of spring urges the pads out towards the bore hole wall and provides a resilient force which varies little with the extension of the arms. An auxiliary resilient force is furnished by two coil springs mounted in the sonde body member, each of which acts on a pair of opposite arms. This spring system will be described in detail below. Adjustments to the compression of these springs is controllable from the surface equipment. Thus it is possible to increase or decrease the pad bearing pressure during the measurements, which may be taken either intermittently or continuously as the pads are moved along the axis of the sonde in accordance with the movement of the cable 11. By controlling the compression of the springs, adequate contact of all the pads with the borehole wall is ensured.

It is thus possible to obtain a very large increase in the force applied to the pads because the force furnished by the coil springs (very powerful coil springs can be chosen) has a broad adjustment range. At the same time, the resilient force can be limited, for normal conditions, to the value which is simply sufficient for obtaining proper pad application. The application of the separate forces of the different springs is significant because if a force only suited to extreme conditions were applied constantly, the resistance to the retraction of the arms would become very high. In that event, were the pads to encounter a sudden reduction in the size of the borehole, for example in a section following a cave, the pads would "stick" to the walls or there would at least be a very clear slowing of the movement in relation to the set speed, this "yoyo" phenomenon being very troublesome. In addition, the arm retraction mechanism would have to be more powerful.

Figure 4:
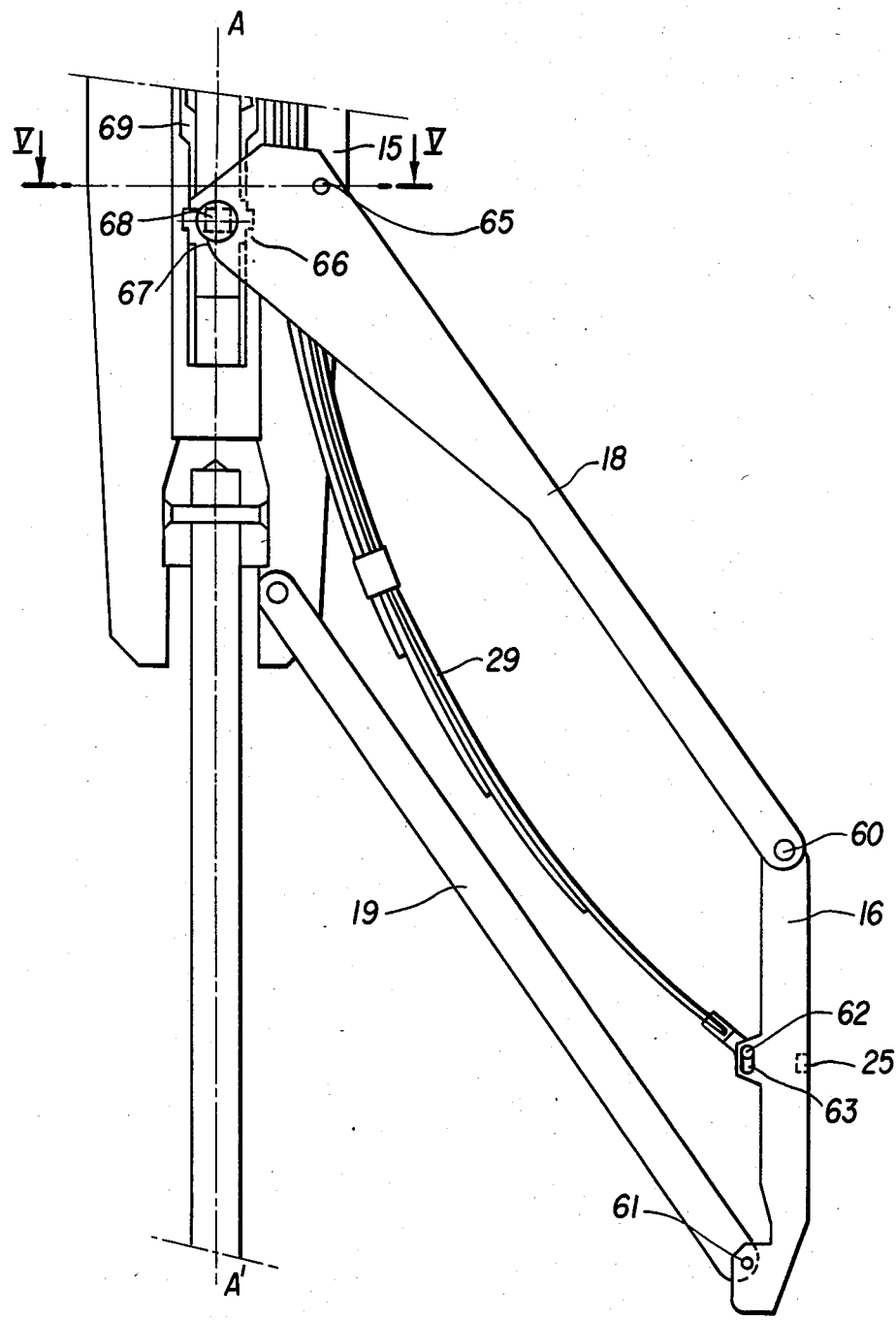
FIG. 4 is an axial sectional view showing in greater detail the lower portion of the sonde and in particular the link with the arms.
Figure 5:
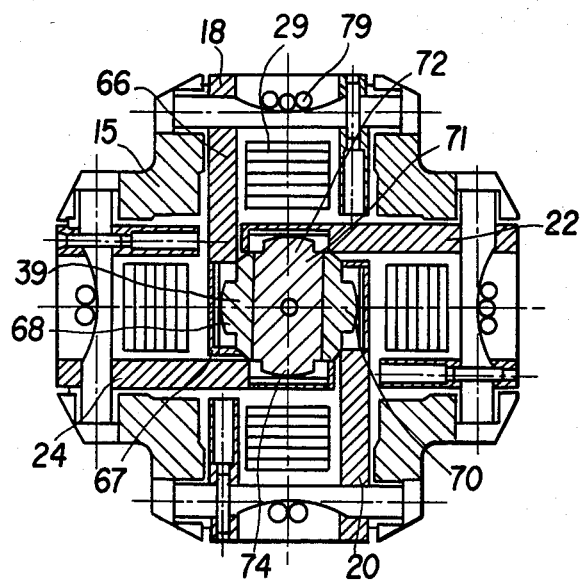
FIG. 5 is a cross-sectional view along the plane V—V of FIG. 4 in larger scale.

A detailed description will not be given to the arm movement and a pad bearing pressure control devices. FIGS. 4 and 5 illustrate the connection of the arms to the sonde body member of axis A–A'. In FIG. 4, only one pad-arm assembly is shown for more clarity. The pad 16 is connected to the main arm 18 and to the secondary arm 19 by pivots 60 and 61 respectively. The pad is also subjected directly to the resilient action of the leaf spring 29 whose end 62 is engaged in an opening 63 provided on the interior side of the pad. The other end of the leaf spring is fixed to the sonde body member.

The main arm 18 is connected to the body member 15 by a pivot 65. As shown in FIG. 5, the main arms have a U section and one of the branches of the U widens in the direction of the body in the form of an extension 66. This extension 66 includes a circular hole in which is fitted a disc 67 equipped with a central slot oriented perpendicular to the axis A–A'. The disc 67 is engaged through this slot on a square stud 68 formed on an actuating rod 69 mobile along the axis A–A'. A movement of the rod 69 thus causes the pivoting of the main arm 18 around the pivot 65. The circle-arc movement of the disc 67 following the movement of the stud 68 entails a small lateral movement of the disc. This movement is made possible by the fact that the disc 67 can slide perpendicular to the axis A–A' in relation to the stud 68 whose lateral dimension is smaller than that of the disc slot.

As shown in FIG. 5, the rod 69 has a second stud 70 diametrically opposite to the stud 68 and which is connected to the main arm 20 opposite the arm 18, the mode of connection being the same. The arms 18 and 20 are arranged so that their respective extensions 66 are located on the opposite sides of the rod 69.

The other pair of main arms 22, 24 is actuated by a second rod 71 mounted inside the rod 69 and equipped with two opposite square studs 72, 74. As shown clearly in the perspective view of FIG. 7, the rod 69, in its terminal part, has a substantially square section and includes a central bore 75 in which is slidably mounted the rod 71. The rod 69 also includes a longitudinal opening 76 traversed by the studs 72, 74 of the rod 71 and which allows relative movements between the two rods 69 and 71.

It is seen in FIG. 5 that the arms 22, 24 are identical to the arms 18, 20 and that their connection to the rod 71 is designed exactly like the connection of the arms 18, 20 to the rod 69. The described arrangement makes it possible to obtain the coupling of each pair of opposite arms and the independence of the two pairs of arms previously mentioned.

It will be noted that transducers, not shown, are provided for detecting the movement of each rod 69 and 71. The signals produced by these transducers are indicative of the extension of each pair of arms and thus make it possible to determine the size of the borehole along two perpendicular directions. This information is used, as stated, for dip determination.

Figure 6:
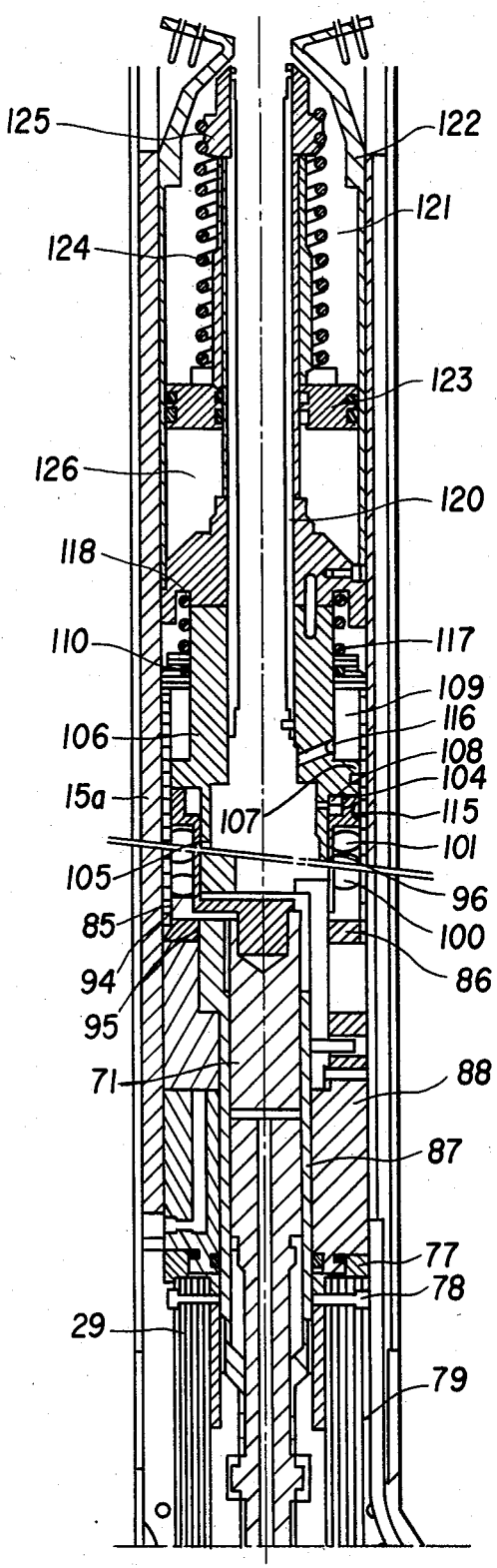
FIG. 6 is an axial sectional view of the portion of the sonde comprising the arm control elements.

As shown in FIG. 6, the leaf springs 29 are fixed on a part 77 of the sonde body member by means of screws 78. Reference 79 in FIGS. 5 and 6 designates the conductors connecting the electrodes carried by the pads to the electronic cartridge 21.

Figure 7:
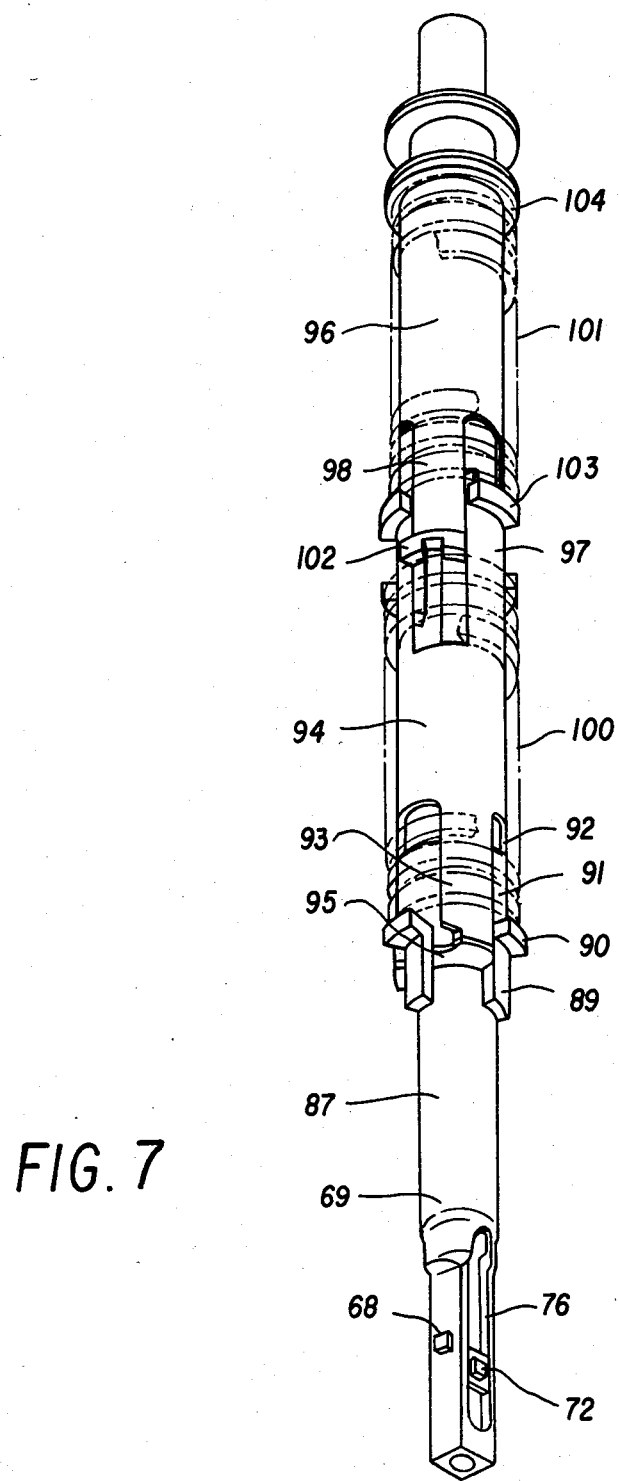
FIG. 7 is a perspective view of certain parts represented in FIG. 4.

The actuating rods 69 and 71 can be moved upward (in FIGS. 4 and 6) for the retraction of the arms. For this purpose a tubular retraction piston 85 is provided. Piston 85 is mobile within a case 15a which forms part of the sonde body member, said piston carrying a thrust ring 86 screwed onto its end. As seen in FIGS. 6 and 7, the rod 69 includes a central part 87 guided in a part 88 of the sonde body member and, on the end opposite the arms, three sectors of greater diameter distributed regularly around the periphery of the rod 69. Each sector is composed of a part 89 connected to the central part 87, whose outer diameter is smaller than the inner diameter of the thrust ring 86, a projecting part 90 designed for radial contact with the ring 86 to enable the piston 85 to move the rod 69, and a terminal part 91 with an outer diameter greater than the inner diameter of the thrust ring 86.

The terminal parts 91 are respectively engaged in the intervals 92 provided between fingers 93 constituting the end of a sleeve 94 of the same outer diameter as the terminal parts 91. The fingers 93 are fixed to respective projecting parts 95 formed on the end of the inner actuating rod 71. These projecting parts 95 have an outer diameter equal to that of the sleeve 94 and hence greater than the inner diameter of the thrust ring 86. This permits the retraction piston 85 to also move the rod 71. It will be noted that the longitudinal dimension of the opening 76 formed in the rod 69 and that of the intervals 92 are calculated to allow relative movement between the two rods 69 and 71 so as to obtain the independence of the two opposite arm pairs. However, as required, the upward movement of the retraction piston 85 causes the movement of the two rods 69, 71 and the retraction of the two pairs of arms.

The end of the sleeve 94, on the side opposite the arms, is interpenetrated with the end of a tubular piston 96. The end of the sleeve 94 is made up, as shown in FIG. 7, of three fingers 97 arranged at 120 degrees and, similarly, the end of the piston 96 is made up of three fingers 98, the fingers 97 (or 98) being engaged in the intervals separating the fingers 98 (or 97).

Furthermore, a coil spring 100 is mounted around the sleeve 94, and a second coil spring 101 is placed around the piston 96. The spring 100 is mounted between and bears on the radial projections 102 formed respectively on the end of the fingers 98 of piston 96 and on the projecting parts 90 of the external actuating rod 69. The spring 101 is mounted between radial projections 103 formed respectively on the ends of the fingers 97 of the sleeve 94 and a stop collar 104 which constitutes the end of the piston 96 on the side opposite the fingers 98.

The springs 101, 102 are surrounded by the retraction piston 85, while piston 96 and the sleeve 94 surround a tubular part 105 forming part of the sonde body member. Inside this tubular part are mounted a hydraulic control unit, not shown in FIG. 6, but described in detail below, and its drive motor. The tubular part 105 is extended by a part 106 of larger thickness and diameter, the parts 105 and 106 being connected by a radial collar 107. This collar 107 defines a first annular chamber 108 with the collar 104 of the portion 96 and a second annular chamber 109 with a collar 110 formed on the end of the retraction piston 96 and extending radially inward. The sealing of the chambers 108 and 109 is provided by seals mounted respectively on the collars 104, 107 and 110. Chambers 108 and 109 communicate with the hydraulic unit through respective channels 115, 116.

With the described arrangement, the spring 100 exerts a resilient force on the external actuating rod 69 since it bears on the projecting parts 90 of the rod 69. The spring 101 acts on the internal actuating rod 71 since it bears on the projections 103 on this rod 71.

The piston 96 is used for adjusting the biasing force exerted by each of the coil springs 100, 101. In the position of FIG. 6, the piston 96 is up against the fixed collar 107 and the springs are under minimum compression. When the piston 96 moves downward under the action of the pressure created in the chamber 108 by the hydraulic unit, as explained below, the compression of the spring 101 bearing on the collar 104 of the piston 96 increases and, as the other spring 100 bears on the radial projections 102 constituting the end of the piston 96, it is compressed by the same amount as the spring 101. Thus, the increase in the application pressure following the movement of the piston 96 is the same for all the pads.

A displacement transducer, not shown, is housed in the tubular part 105 to detect the position of the sleeve 94. This signal produced by this transducer is thus indicative of the degree of compression of the springs 100, 101.

The retraction piston 85 is subjected to the action of a coil spring 117 which urges it toward the arm extension position (downward in FIG. 6). This spring 117 bears on an annular extension 118 of the fixed part 106.

A tube 120 is fixed inside the fixed part 106 and the extension 118. The inside of this tube is filled with oil and communicates with a chamber 121 which is delimited by a box 122 mounted on the outside of the case 15a and by a piston 123. This piston is subjected to tensile force by a spring 124 screwed on one end to the part on the piston 123 and on the other end to a stop piece 125 fixed on the other end of the tube 120. The extension 118 and the piston 123 define between them a chamber 126 which communicates with the exterior. During a measurement operation in a borehole, the drilling mud penetrates into the chamber 126 and the mud pressure is imparted by the piston 124 to the oil present in the chamber 121 and to the inside of the tube 120, thereby providing suitable pressure balancing. This oil flows in the hydraulic unit and forms the reservoir necessary for its operation.

The hydraulic unit is shown schematically in FIG. 8. To better understand its relationship with the elements described above, a schematic representation is given in FIG. 8 of the piston 85 controlling the retraction of the arms. The piston 85 is subjected to the pressure prevailing in the chamber 109, hereinafter called the retraction chamber, and to the resilient action of the spring 117. Also shown schematically is the piston 96 designed to adjust the compression of the springs 100 and 101, this piston being subjected to the pressure in the chamber 108, hereinafter called the compression chamber.

The hydraulic unit includes a distributor, designated generally by the reference 130, which is made up of a fixed cylinder 131 and a mobile piston 132 of axis B–B'. The cylinder 131 includes, associated with each of its terminal walls 133, 134, a transverse partition 135, 136 equipped with a central hole for the passage of the piston 132, seals being provided for tightness. The chamber 137 defined between the wall 133 and the partition 135 communicates at all times with the retraction chamber 109 via the channel 116 and can communicate with the reservoir via a circular opening 139 centered on the axis B–B' of the piston 132. In FIG. 8, the reservoir is designated by the reference 140.

Symmetrically, on the other end of the cylinder 131, the terminal wall 134 and the partition 136 define a chamber 141 which communicates at all times with the compression chamber 108 via the channel 115 and which can communicate with the reservoir via a circular opening 143 centered on the axis of the piston 132. Relief valves 145, 146 are branched respectively between the channels 115 and 116 and the reservoir.

The piston 132 has a generally tubular structure with a portion 150 going through the partition 135 and a portion 151 going through the partition 136. At the connection of these two portions is a transverse partition 152 which separates in a sealed manner the space between the partitions 135 and 136 of the cylinder into two chambers, namely the chamber 154 between the fixed partition 135 and the mobile partition 152, and the chamber 155 between the mobile partition 152 and the fixed partition 136. The chamber 155 communicates with the inside of the portion 150 of the piston through an opening 157. The chamber 154 can be connected by a channel 160 to the reservoir by means of a normally open electromagnetic valve 161 and a ball valve 162. A narrow orifice 159 is provided in the seat of the ball valve for a purpose which will be explained below.

The chamber 155 is connected via a channel 163 to a pump 164 driven by a motor 165, a nonreturn valve 166 being mounted in this channel. The pump 164 draws oil from the reservoir through a filter 167. The chamber 155 can also be placed in communication with the reservoir via a channel 168 in which is provided a normally closed electromagnetic valve 169.

The piston 132 is urged toward the right (in FIG. 8) by a coil spring 170 mounted between the fixed partition 135 and the partition 152 of the piston.

A valve member 171 is mounted inside the portion 151 of the piston 132 (located on the right in FIG. 8). This valve member includes a cone 172 formed on the end of a shank 173 and, on the other end, a truncated flare 174 joining the shank. The diameter of the shank 173 is slightly larger than that of the opening 143 so that the cone 172 is capable of closing off the opening 143 as shown in FIG. 8. A coil spring 175 bearing on an inner shoulder 176 urges the valve member 171 into the closed position (toward the right in FIG. 8). As seen in FIGS. 8 and 9, the truncated flare 174 is designed to cooperate with a seat made up of the edge of another inner shoulder 177 near the end of the piston, thereby closing the communication between the chamber 141 and the inside of the piston 132 connected to the chamber 155. It should be noted in this regard that, when the piston 132 is up against the wall 134, as shown in FIG. 8, and the cone 172 closes off the opening 143, the truncated flare 174 is not in contact with its seat. In other words, as shown better by the detail view of FIG. 9, the axial distance a between the edge 180 of the shoulder 177 designed to be in contact with the truncated flare 174 and the end face of the piston 132 which comes up against the wall 134 is smaller than the axial distance b between the circular zone 181 of the truncated flare 174 which comes into contact with the edge 180 and the circular zone 182 of the cone 172 which comes in contact with the opening 143.

The end of the piston 132 which is in contact with the terminal wall 134, in the position of FIG. 8, includes slots 178 which allow communication between the inside of the portion 151 of the piston and the chamber 141 when the piston 132 is in contact with the wall 134.

A symmetrical arrangement is provided on the other end of the piston 132 with a valve member 191 of the same form as the valve member 171, equipped with a cone 192 to close off the opening 139 and a truncated flare 194 designed to cooperate with an inner shoulder 197 to close off the communication between the chamber 137 and the inside of the tubular portion 150 of the piston. The valve member 191 is urged toward the closed position by a coil spring 195 bearing on an inner shoulder 196.

In the position shown, the configuration of the valve member 191 is the opposite of that of the valve member 171, i.e. it is in contact with the shoulder 197 and does not close off the opening 139. Moreover, a ball 200 is confined between inner projections 196 allowing the passage of oil and an inner shoulder 201 of the portion 150, serving as a seat for the ball 200. A small orifice 202 is provided in the seat 201 to maintain communication between the inside of the portion 150 and the inside of the portion 151 when the ball 200 is against its seat.

The operation of the hydraulic unit will now be described during a dipmetering operation.

The position shown in FIG. 8 is the rest position, the arms being extended under the action of their springs. The piston 132, under the action of the spring 170, is up against the wall 134. The motor 165 is stopped. The electromagnetic valves 161 and 169, the electromagnets of which are not energized, are closed. The retraction chamber 109 communicates with the reservoir, while the valve member 171 allows communication between the compression chamber 108 and the chamber 155. The chamber 154 is closed by the electromagnetic valve 161.

The first operation consists in placing all the chambers in pressure equilibrium with the reservoir. To accomplish this, the opening of the valves 161 and 169 is actuated. The compression chamber 108 is thus placed in communication with the reservoir via the chamber 155 and the valve 169. Likewise, the chamber 154 is placed in communication with the reservoir via the valve 161. The retraction chamber 109 is already in communication with the reservoir. Once this equilibrium is reached, the electromagnets of the valves 161 and 169 are no longer energized.

It is then necessary to move the piston 85 to retract the arms for lowering to the borehole. For this, the motor 165 is started up to drive the pump 164, and the valve 161 is opened to place the chamber 154 in communication with the reservoir so that the oil present in this chamber does not oppose the movement of the piston 132. The increase in pressure in the chamber 155 due to the operation of the pump causes a movement of the piston 132 against the action of the spring 170 until it comes up against the terminal wall 133. Owing to this movement, the cone 192 of the valve member 191 closes off the opening 139, thereby closing the communication of the retraction chamber 109 with the reservoir. Meanwhile, the truncated flare 194 is moved away from its seat, placing the retraction chamber in communication with the chamber 155 via the inside of the portion 150 of the piston.

The reverse process takes place on the other end of the piston 132. The truncated flare 174 is placed in contact with its seat while the cone 172 stops closing off the opening 143. The compression chamber 108 thus stops communicating with the chamber 155 but is placed in communication with the reservoir. The result is that the pressure increase in the retraction chamber moves the piston 85 against the action of the spring 117, and the arms are retracted along the sonde body member. As the compression chamber is at the pressure of the reservoir, the piston 96 remains in the rest position.

Once the arms have been retracted, the motor 165 is stopped. The return of the valve 161 to the closed position can take place before the stopping of the motor. After the stopping of the motor, the valves 161 and 169 having been closed, no movement of the piston 132 takes place and it remains up against the wall 133. The arms hence remain retracted.

The lowering of the apparatus into the borehole can thus be carried out. When the apparatus has reached the depth at which the measurement movement is to begin, the arms must be extended so that the pads come into contact with the borehole wall. To accomplish this, the two valves 161 and 169 are opened. The piston 132 begins to move under the action of the spring 170 because the pressure drops in the chamber 155.

As there is a distance (b-a) which must be traversed by valve member 191 before truncated flare 194 engages seat 197 as previously described, the valve member 191 remains in the same position at the beginning of piston movement. The retraction chamber does not yet communicate with the reservoir. It no longer communicates with the chamber 155 except through the small orifice 202 because the pressurized oil it contains applies the ball 200 against its seat 201. This prevents the pressurized oil from going through the valve 169 and damaging it.

The return of the piston 132 and the valve member 191 into the position of FIG. 8, establishes the communication of the retraction chamber with the reservoir and the closing of its communication with the chamber 155. The valves 161 and 169 are then closed.

During measurement, if it is wished to increase the pad bearing pressure, the piston 96 must be moved. For this, the motor 165 is started up, the valves 161, 169 remaining closed. The pressure increases in the chamber 155 and hence the compression chamber 108 which communicates with it.

The relief valve 145 defines the maximum valve $P_{max}$ that the pressure can reach in the compression chamber. To set the pressure at a value lower than $P_{max}$, the motor need only be stopped when this value is reached. The pressure keeps this value after the motor is stopped. If afterward it is considered that the pad bearing pressure can come back to a lower value, the pressure in the compression chamber is reduced. For this, the valve 169 is opened to place the compression chamber in communication with the reservoir via the chamber 155. The valve 169 is closed when the desired value is reached.

To bring the pressure in the compression chamber back to its minimum value, namely the pressure of the reservoir, there are two possibilities. The valve 169 can be opened, in which case the drop in pressure is slow, the orifice offered by this valve being small. The other possibility, allowing a faster pressure drop, consists in opening the two valves 161 and 169. The chamber 154 is in communication with the reservoir and because of the difference in the pressure between the chamber 154 and the chamber 155, the piston 132 moves against the action of its spring, moving the valve member 171. The compression chamber 108 is thus placed in communication with the reservoir through the opening 143, thus allowing the pressure in this chamber to drop rapidly.

At the end of the measurement movement, the arms are retracted using the procedure described above.

An emergency procedure moreover exists for obtaining rapid retraction of the arms when a high pressure prevails in the compression chamber 108. For this purpose, the valve 161 is opened. The oil which flows from the chamber 154 applies the ball 162 against its seat and therefore the oil can flow only through the narrow orifice 159 provided in this seat. The piston 132 then moves toward the left because the pressure is high in the chamber 155. However, the speed of piston 132 is limited by the speed at which the oil can escape through the orifice 159.

The motor 165 is then started up. The movement of the piston 132 has closed the communication beteen the retraction chamber 109 and the reservoir, and has established communication between the retraction chamber and the chamber 155, on the one hand, and between the compression chamber 108 and the reservoir on the other. The pressure thus increases in the retraction chamber and the piston 85 moves to retract the arms.

The apparatus described is adapted to measurements in inclined boreholes. In vertical (or at least only slightly inclined) boreholes, the articulated connection between the sonde and the cartridge is no longer necessary because the radial component of the weight is negligible. In this case, the sonde can be fixed rigidly to the cartridge and centering devices can be mounted on the sonde or the cartridge.

The described arrangement which makes it possible to increase the pad pressure is also advantageous in a vertical borehole, particularly in the presence of a high-viscosity drilling mud.

It will be understood by those skilled in the art that the above-described embodiment of the invention is intended to be merely exemplary, and that it is susceptible of modification and variation without departing from the spirit and the scope of the invention.

We claim:

1. Method for logging in a section of a deviated borehole, comprising the following operations:

lowering into the borehole down to a given depth, by means of a cable, an apparatus including an elongated measurement sonde and an elongated cartridge connecting the sonde to the cable, the sonde being equipped with four measuring pads which carry measurement means and which are distributed regularly around the sonde, the pads being placed at the ends of respective arms hinged on the sonde, the opposite pads being kept symmetrical in relation to the axis of the sonde, the dimension of the pads parallel to this axis being at most approximately equal to twice the transverse dimension of the sonde;

applying resiliently the pads against the borehole wall while keeping them parallel to the axis of the sonde, the sonde being centered in relation to the borehole at the height of the pads;

moving the pads along the borehole by pulling on the cable while allowing an angular offset between the axis of the cartridge and that of the sonde, whereby the cartridge can rest on the borehole wall.

2. Method according to claim 1, wherein during said moving step, signals are produced which are indicative of the inclination of the sonde axis in relation to the vertical and its orientation in relation to a reference azimuth.

3. Method according to either of claims 1 or 2, wherein the resilient force applying the pads against the borehole wall is adjustable during their movement.

4. Method according to claim 3, wherein said resilient force results from the addition of a first force which is substantially constant whatever the position of the pads and a second adjustable force.

5. Logging apparatus for investigating the formations traversed by a section of a deviated borehole, comprising: an elongated electronic cartridge arranged to be connected to a cable; and an elongated measuring sonde connected to the cartridge by means of a joint allowing an angular offset between the axis of the sonde and that of the cartridge, the sonde including a body member, four main arms articulated on the body member and distributed regularly around said body member, the opposite arms being forced to remain symmetrically in relation to the axis of the sonde, a secondary arm associated with each main arm, articulated on the body member, four measuring pads connected to the ends of the respective main arms and secondary arms in a parallelogram configuration, the pads thus remaining parallel to the axis of the sonde, the dimension of the pads parallel to the axis of the sonde being at most approximately equal to twice the transverse dimension D of the sonde, resilient means acting to extend the pads away from the body member and a mechanism capable of overcoming the action of the resilient means to retract the pads against the body member.

6. Apparatus according to claim 5, wherein said dimension of the pads is substantially equal to 1.5 times the outer diameter of said elongated sonde.

7. Apparatus according to either of claims 5 or 6, wherein the sonde includes means for producing signals indicative of the inclination of its axis with respect to the vertical and signals indicative of the orientation of said axis with respect to a reference azimuth.

8. Apparatus according to claim 5, wherein said resilient means includes means for applying an adjustable resilient force to the pads.

* * * * *